United States Patent
Ohshima et al.

[11] Patent Number: 5,986,787
[45] Date of Patent: Nov. 16, 1999

[54] NEAR-INFRARED COMMUNICATION APPARATUS

[75] Inventors: Shigeru Ohshima, Yokohama; Yasuhiko Shimomura, Kawasaki; Masahiro Ogusu, Tokyo, all of Japan

[73] Assignee: Kabushiki Kaisha Toshiba, Kawasaki, Japan

[21] Appl. No.: 08/818,723

[22] Filed: Mar. 14, 1997

[30] Foreign Application Priority Data

Mar. 15, 1996 [JP] Japan ................................. 8-059822

[51] Int. Cl.$^6$ ............................................. H04B 10/10
[52] U.S. Cl. ....................... 359/159; 359/152; 359/172
[58] Field of Search ............................ 359/172, 163, 359/152, 159, 117, 11, 405, 580; 370/213; 375/239; 250/214

[56] References Cited

U.S. PATENT DOCUMENTS

| | | | |
|---|---|---|---|
| 4,975,926 | 12/1990 | Knapp | 375/1 |
| 4,977,618 | 12/1990 | Allen | 455/607 |
| 5,191,461 | 3/1993 | Cranshaw et al. | 359/54 |
| 5,416,627 | 5/1995 | Wilmoth | 359/159 |
| 5,539,562 | 7/1996 | Morioka et al. | 359/159 |
| 5,566,022 | 10/1996 | Segev | 359/172 |
| 5,680,241 | 10/1997 | Sakanaka et al. | 359/172 |
| 5,689,354 | 11/1997 | Orino | 359/172 |
| 5,723,937 | 3/1998 | Whitman et al. | 313/116 |
| 5,724,168 | 3/1998 | Oschmann et al. | 359/172 |
| 5,774,247 | 6/1998 | Taglione et al. | 359/152 |
| 5,777,768 | 7/1998 | Korevaar | 359/172 |

FOREIGN PATENT DOCUMENTS 54-25362  8/1979  Japan.

OTHER PUBLICATIONS

IEEE Electronics Letters, vol. 30, No. 5, pp. 430–431, Mar. 3, 1994, M. J. McCullagh, et al., "155 Mbit/s Optical Wireless Link Using a Bootstrapped Silicon APD Receiver".

*Primary Examiner*—Leslie Pascal
*Attorney, Agent, or Firm*—Oblon, Spivak, McClelland, Maier & Neustadt, P.C.

[57] ABSTRACT

Each optical transceiver comprises a photoemissive device for generating a signal light of near-infrared rays, a photoreceptor for receiving the signal light of the near-infrared rays, and an optical lens for converting the signal light outputted from the photoemissive device into a substantially collimated light so as to emit the light into a desired direction and for guiding the signal light from the same direction to the photoreceptor. Directivities of the respective optical transceivers are directed to the same portion on the indoor optical diffusing surface such as a ceiling.

13 Claims, 5 Drawing Sheets

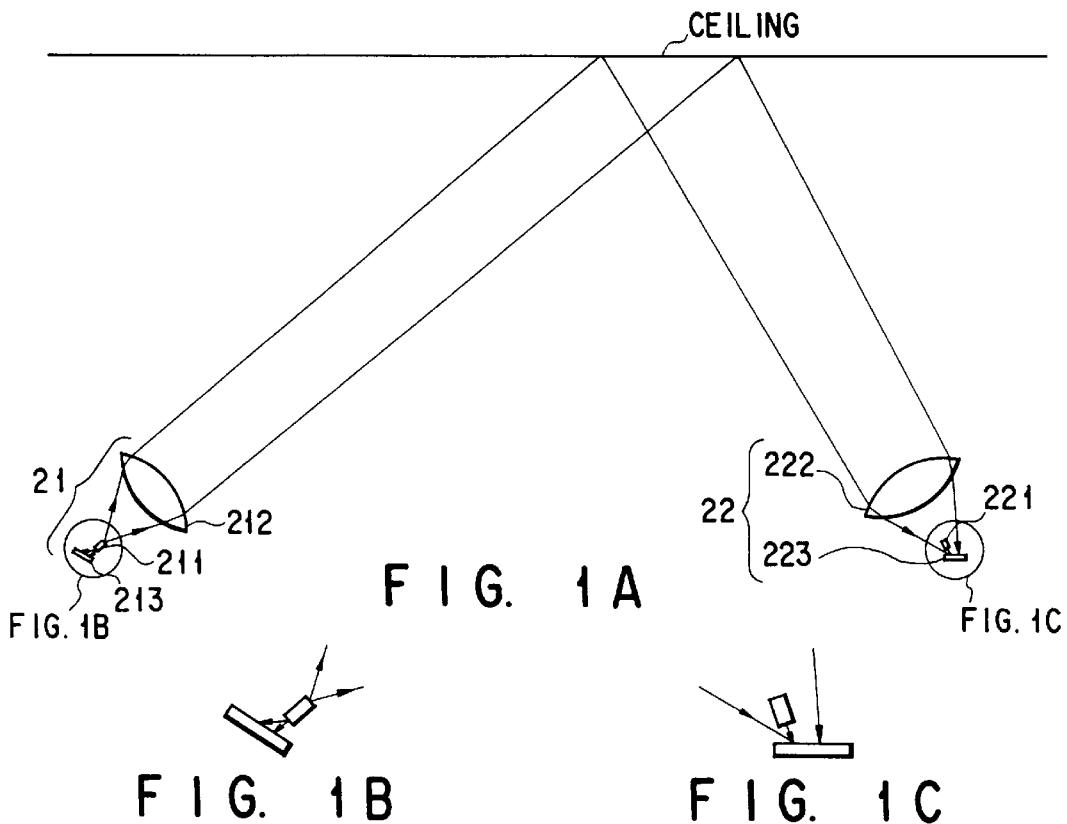
FIG. 1A
FIG. 1B
FIG. 1C
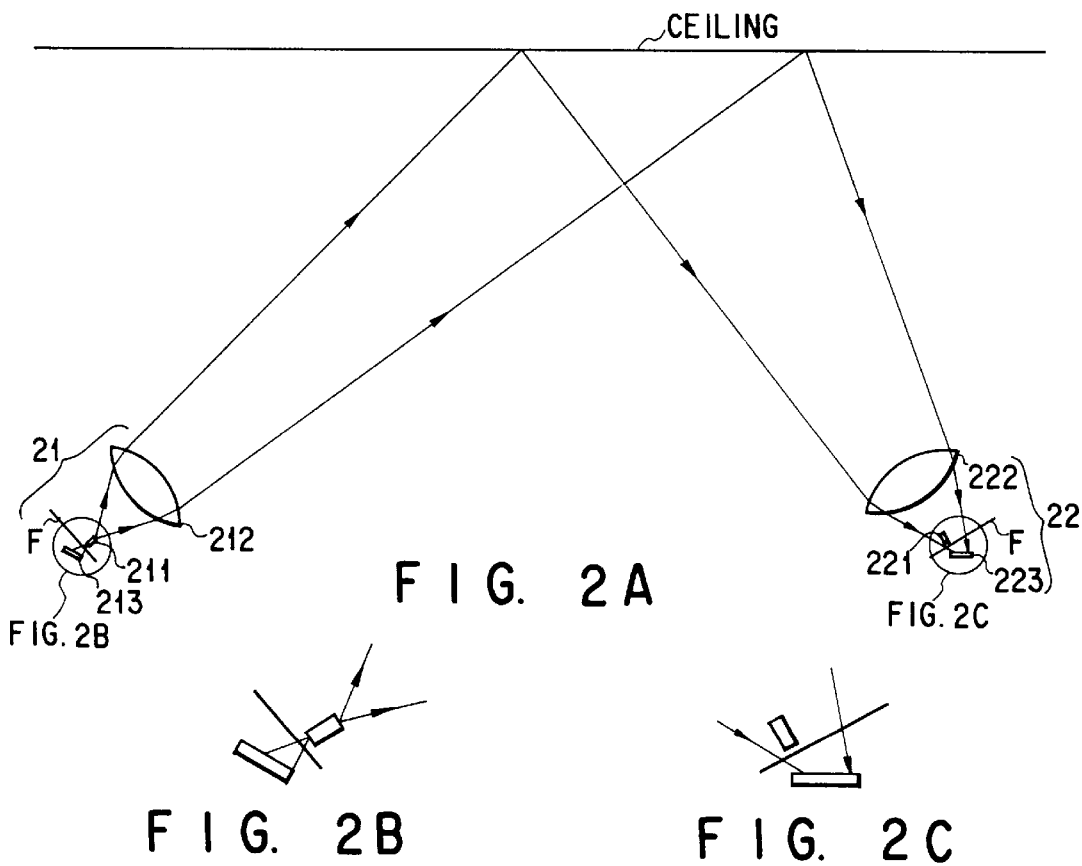
FIG. 2A
FIG. 2B
FIG. 2C

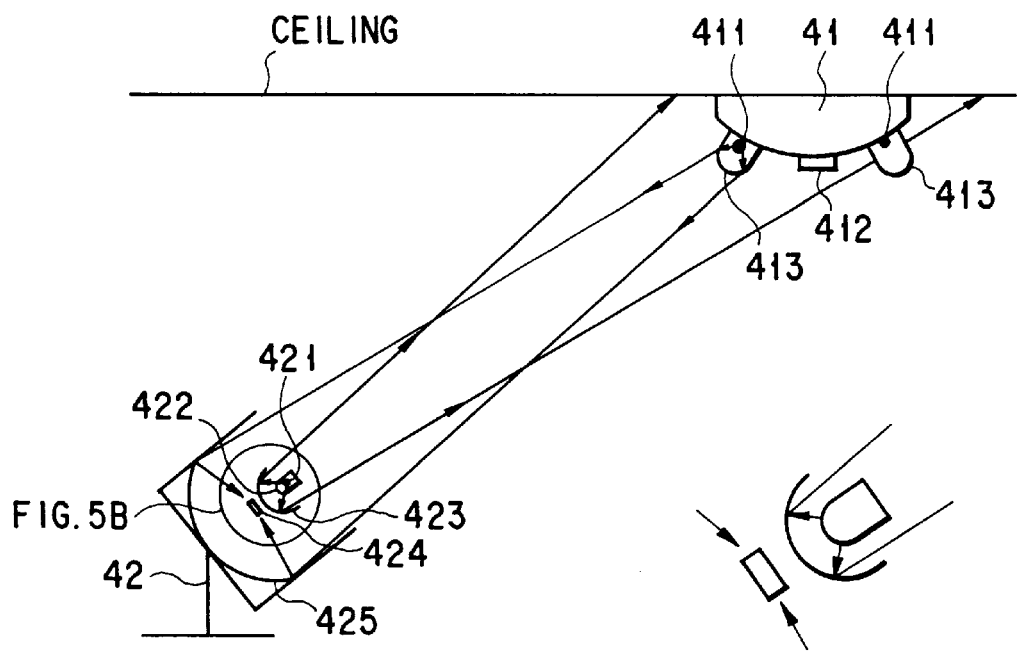
F I G. 5A   F I G. 5B
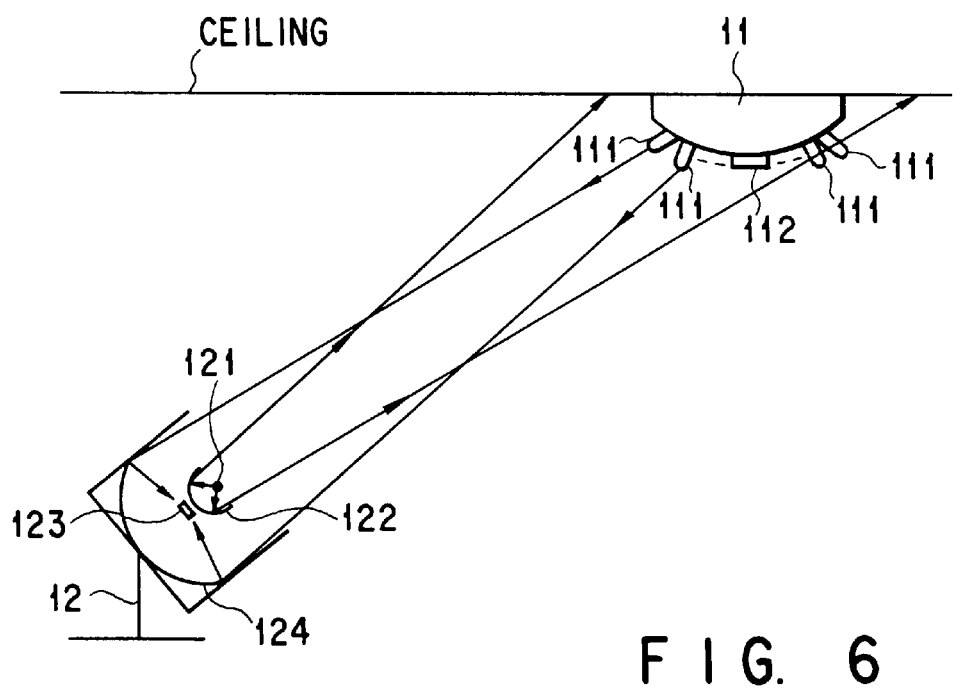
F I G. 6

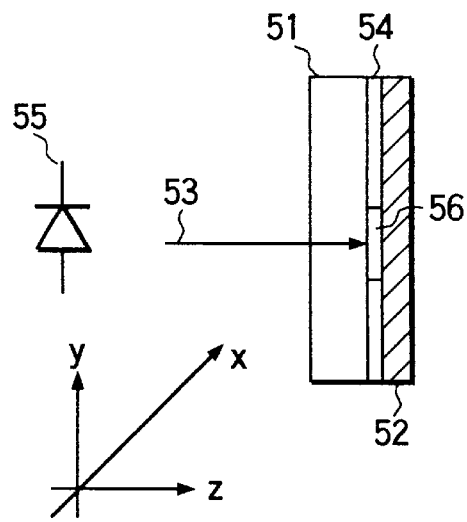
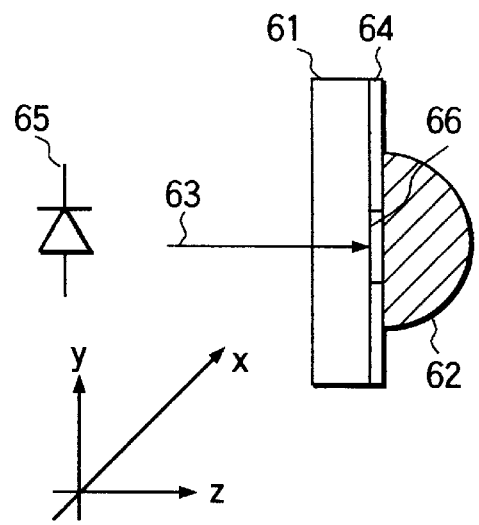
FIG. 7
FIG. 8
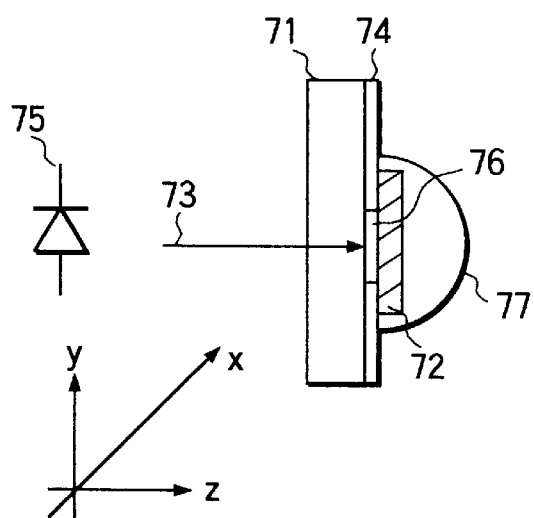
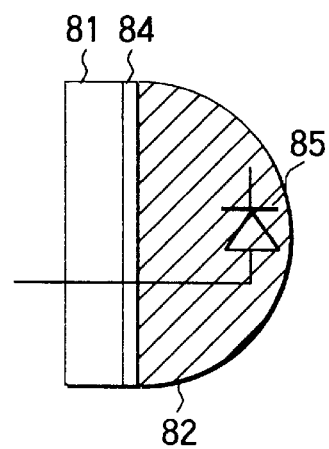
FIG. 9
FIG. 10

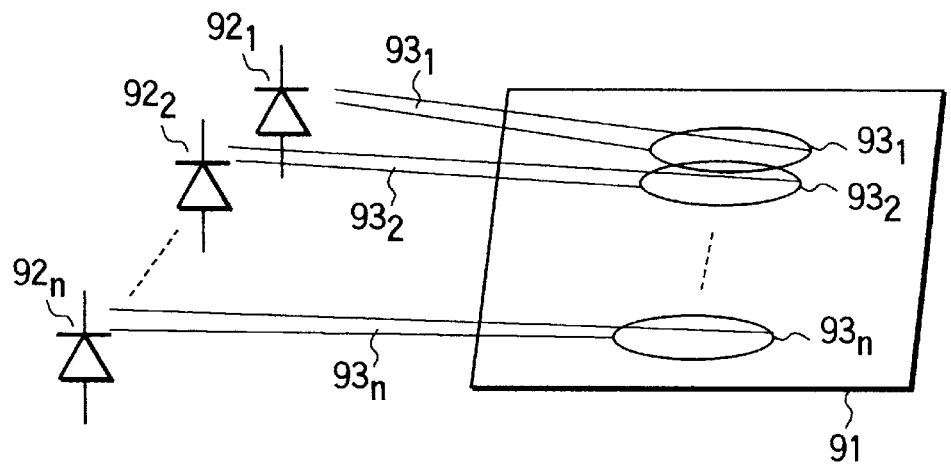
F I G. 11
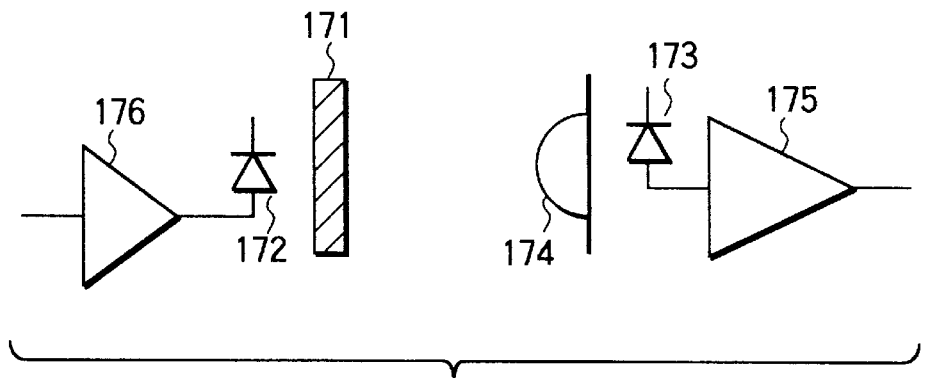
F I G. 12
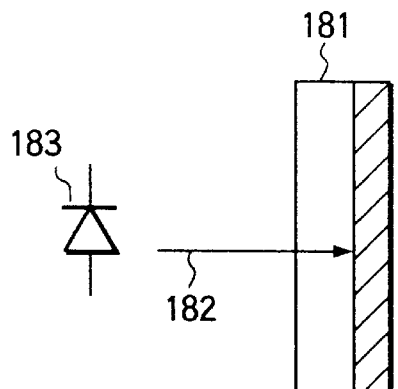
F I G. 13

NEAR-INFRARED COMMUNICATION APPARATUS

BACKGROUND OF THE INVENTION

The present invention relates to a near-infrared communication apparatus for transmitting an optical signal through space.

As is well-known, a near-infrared communication apparatus for transmitting an optical signal through space does not require a provision of an optical fiber and its installation is easy. Because of this advantage, the near-infrared communication apparatus is being widely used for links for connecting two points and for LANs (local area networks).

According to the conventional near-infrared communication apparatus, optical transceivers 11 and 12 are installed on the ceiling and on the table respectively as shown in FIG. 6. The optical transceiver 11 installed on the ceiling has a plurality of LEDs (light emitting diodes) 111 for carrying out transmission and a PD (photodiode) 112, and they are nondirectional as a whole. In the optical transceiver 12 installed on the desk, a transmission light emitted from an LED 121 is converted into substantially collimated lights by a concave mirror 122 and is outputted to the optical transceiver 11 on the ceiling. The light transmitted from the transceiver 11 to the ceiling is collected to a photodiode 123 by a concave mirror 124. With the above-described optical system, it is possible to carry out communications between the transceivers 11 and 12 to about 10 Mbps.

There is also a near-infrared communication apparatus for emitting a transmission light to the ceiling and for receiving the light diffused on the ceiling, without the provision of a transceiver on the ceiling. According to this system, however, the power of the received light becomes weak so that an optical signal can be transmitted at only a low speed of about 1 Mbps.

When the case of increasing the transmission speed to about 100 Mbps is considered, this realization is not easy because it is difficult to achieve an LED of both high speed and high output. Thus, the use of a high-output LD (laser diode) in stead of an LED is considered. However, the LD has a high coherency and therefore it is necessary to take into consideration bad influence that can be observed by human eyes.

In order to avoid the above problem, a method for reducing spatial coherency with a diffusing plate using a holography has been proposed. However, even if the holography is used, the light power intensity must be kept less than 100 mW/cm2. Further, when a high-output laser is used, a beam of a large diameter must be formed, with the result that the apparatus becomes bulky. Moreover, the holography of a large diameter has a problem of mass production and thus this is expensive.

Further, according to the above-described prior-art example of installing the optical transceiver on the ceiling, it is necessary to make arrangement for preventing signal lines and current lines from falling from the ceiling, which requires a troublesome installation work.

Further, under the trend of increasing need for a higher speed communication system, high attention has been paid to IrDA (Infrared Data Association) devices and diffusion type LANs for the purpose of increasing the data transmission speed.

In order to achieve high-speed data transmission of above 50 Mbps or 100 Mbps and to achieve compact transceivers, a laser diode is effective as a photoemissive device in the light of the fact that the laser diode can perform high-speed modulation and is highly efficient. However, the laser diode has a problem of high spatial coherency of an emitted beam while having the above-described advantages. Accordingly, from the viewpoint of the protection of the human body, a method of once diffusing an output light from the laser diode, or making the laser beam incoherent, and then radiating the diffused light to the space is known as described, for example, in the IEEE Photonics Technology Letter, VOL. 6, No. 10, pp 1268-(1994), "50-Mb/s Diffuse Infrared Free-space Link Using On-off Keying With Decision-Feedback Equalization", (Gene W. March et al.).

A conventional optical spatial transmission apparatus is structured by an optical diffusing plate 171, a laser 172, a photoreceptor 173, an optical system 174 made of an optical filter and a lens, a receiving circuit 175 and a driving circuit 176, as shown in FIG. 12.

Data transmitted from the driving circuit 176 is inputted to the laser as a modulation signal. An optical signal outputted from the laser 172 is diffused by the optical diffusing plate 171 and is then radiated to the space. The optical signal radiated to the space has its disturbance light removed by the optical system 174 made of the filter and the lens. The optical signal is then collected by the photoreceptor 173 and is then photoelectrically converted. The photoelectric signal is guided to the receiving circuit 175. The light of the laser is made incoherent by using the optical diffusing plate 171 as described above, to thereby secure the safety of the human body.

The optical diffusing plate to be used by the above-described conventional optical spatial transmission apparatus is structured by a glass plate 181 and an optical diffusion area 184, as shown in FIG. 13. The optical diffusing plate 184 includes a frost-type glass of which surface is frosted by using an abrasive and an opal-type glass on the surface of which a fine-particle optical diffusing substance is dispersed.

The magnitude of the dispersion of these optical diffusing plates and optical loss have mutual opposite effects. In other words, when the diffusion effect of the optical diffusing plate becomes large, a laser beam can be made incoherent sufficiently to ensure safety of the human body, but this causes a larger optical loss. Therefore, when the priority is placed on the safety of the human body, the optical loss becomes larger so that it is not possible to achieve an increase in the data transmission speed or it is not possible to expand the cover area.

Further, since the beam pattern of the laser beam is oval, an image formed by the lens on the light receiving side also becomes oval so that the photoreceptor and the light receiving surface do not match sufficiently. In other words, the area of the light receiving surface onto which an optical signal is effectively emitted to the photoreceptor becomes a part of the light receiving surface, and thus the stray capacity of the photoreceptor becomes larger than is necessary. Accordingly, the data transmission speed of the data that can be received becomes low. Moreover, when the light of a part of the oval is received on the light receiving surface, the light receiving power becomes smaller. Therefore, when the received light and the light receiving surface do not match satisfactorily, the increasing of the data transmission speed is interfered.

BRIEF SUMMARY OF THE INVENTION

It is an object of the present invention to provide a compact near-infrared communication apparatus of good productivity which can perform a high-speed transmission and which does not give bad influence to the human body.

It is another object of the present invention to provide an optical diffusing plate having a large diffusion effect which is suitable for application to an optical spatial transmission of low optical loss.

Further, it is another object of the present invention to provide an optical diffusing plate which can perform a diffusion of a laser beam for achieving a high-speed data transmission in an optical spatial transmission.

According to a first aspect of the present invention, there is provided a near-infrared communication apparatus comprising a plurality of optical transceivers for carrying out optical communications by transmitting and receiving a signal light of near-infrared rays through an indoor space, each of the optical transceivers including: at least one photoemissive device for generating the signal light of near-infrared rays; at least one photoreceptor for receiving the signal light of near-infrared rays from another of the optical transceivers; and at least one optical system for converting the signal light output from the photoemissive device to a substantially collimated light and emitting it in any direction and guiding the light from the same direction to the photoreceptor of a self-one of the transceivers, wherein the optical system is arranged so as to direct directivity of each of the optical transceivers to the same portion within an indoor optical diffusion surface.

Particularly, in each of the optical transceivers, a semiconductor laser is used for the photoemissive device and the photoreceptor is disposed at a position facing the laser beam emitting plane opposite to the main laser beam emitting plane, to thereby monitor the laser beam.

Further, according to a second aspect of the present invention, the re is provided a near-infrared communication apparatus comprising a plurality of optical transceivers for carrying out optical communications by transmitting and receiving a signal light of near-infrared rays through an indoor space, each of the optical transceivers including: at least one semiconductor laser for generating the signal light of near-infrared rays; at least one photoreceptor for receiving the signal light of near-infrared rays from another of the optical transceivers; and at least one optical system for converting the signal light output from the photoemissive device to a substantially collimated light and emitting it in any direction and guiding the light from the same direction to the photoreceptor of a self-one of the transceivers, wherein the optical system is arranged so as to direct directivity of each of the optical transceivers to the same portion within an indoor optical diffusion surface, and has at least one optical diffusion plate for diffusing the signal light, the optical diffusion plate having Mie scattering characteristic in which forward scattering light intensity is stronger than backward scattering light intensity.

Particularly, each optical transceiver further has an optical system for converting the forward scattering light from the optical diffusing plate to a substantially collimated light, and emits the signal light transmitted through this optical system, to the indoor optical diffusing surface.

Further, each optical transceiver has the optical diffusing plate disposed inside the focusing surface of the optical system and has the photoreceptor for receiving the signal outside the focusing surface.

Further, the optical diffusing plate is formed by mixing fine particles into an adhesive and by coating the mixture on a panel-shaped member.

To be more specific, the optical diffusing plate is formed as follows. A mixture of fine particles with an adhesive is stuffed into a nozzle having a photoreceptor inside the nozzle. A panel-shaped member is integrated with a semiconductor laser. The semiconductor laser is then light-emitted and the nozzle position is adjusted so that the light power intensity obtained from the photoreceptor inside the nozzle becomes maximum. Then, the mixture is coated on the panel-shaped member. Thus, the optical diffusing plate is formed.

In other words, according to the near-infrared communication apparatus relating to the first aspect of the present invention, the optical system for converting the light emitted from the photoemissive device to a substantially collimated light is also used for the optical system for collecting the light to the photoreceptor. Further, when a semiconductor laser is used as the photoemissive device, the photoreceptor is disposed at a position to which the light is emitted from the other side of the semiconductor laser so that the photoreceptor is used as a laser beam monitor as well.

According to the near-infrared communication apparatus relating to the second aspect of the present invention, each optical transceiver has a semiconductor laser for transmitting a signal light and an optical diffusing plate for diffusing the light of the semiconductor laser, and the optical diffusing plate has the Mie scattering characteristic in which forward scattering light intensity is stronger than the backward scattering light intensity.

Further, there is also provided an optical system such as an optical lens or a concave mirror for converting the forward scattering light from the optical diffusing plate to a substantially collimated light, so that the collimated light is emitted to the light diffusing surface such as the indoor ceiling for further diffusing the laser beam.

Further, by disposing the optical diffusing plate inside the focusing surface of the optical system and by disposing the photoreceptor for receiving the signal outside the focusing surface, the light receiving area of the photoreceptor is expanded.

The optical diffusing plate can be formed by mixing fine particles into an adhesive and by coating the mixture on a panel-shaped member. In other words, the optical diffusing plate can be easily manufactured as follows. A mixture of fine particles with an adhesive is stuffed into a nozzle having a photoreceptor inside the nozzle. A panel-shaped member is integrated with a semiconductor laser. The semiconductor laser is then light-emitted and the nozzle position is adjusted so that the light power intensity obtained from the photoreceptor inside the nozzle becomes maximum. Then, the mixture is coated on the panel-shaped member. Thus, the optical diffusing plate is formed.

According to the first aspect of the present invention, the optical system for converting the light emitted from the photoemissive device for transmitting the light to a substantially collimated light is used for the optical system for collecting the light to the photoreceptor. This arrangement is made possible because when a signal light is emitted to a light diffusing surface such as a ceiling, the light diffused on the surface of the ceiling has a smaller spatial coherency. In other words, even if the light diffused on the surface of the ceiling is collected, a spot size of the photoemissive device is not reproduced but an image of a portion of the surface of the ceiling to which the light is emitted is reproduced. Accordingly, the image formed by collecting the light by the optical system becomes larger than the photoemissive device, and the signal light can be received by installing the photoreceptor at a position where the light not interfered by the photoemissive device can be received.

The near-infrared communication apparatus relating to the second aspect of the present invention provides with the optical diffusing plate having the Mie scattering characteristic in which forward scattering light intensity is stronger in order to diffuse the light from the semiconductor laser for transmitting the light. The light scattering can be passed through fine particles but the state of scattering changes according to the particle size. For example, when the particle size is not larger than one tenth of the waveform, the backward and forward scattering light intensities are almost equal (this is called a Rayleigh scattering). When the particle size becomes larger, the forward scattering light intensity increases and this becomes the Mie scattering.

According to the Rayleigh scattering, the spatial coherence is almost completely lost, but the optical power can be effectively utilized by only a half at most. On the other hand, according to the Mie scattering, some spatial coherence remains and a speckle pattern appears. However, if the speckle pattern is smaller to some extent (as compared with the size of the pupil of the eye), bad influence to the eyes can be reduced. Accordingly, it is effective to select the Mie scattering in which forward scattering intensity is larger within such range. Under the above conditions, the forward scattering intensity is stronger than the backward scattering intensity by two to five times, so that the optical loss on the diffusing plate can be reduced.

The above-described photo-diffusing plate can be provided by mixing fine particles with an adhesive and then coating the mixture on a glass plate or the like. The state of diffusion changes depending on the thickness of the coating, the size of the particles and the difference of refractive indexes of the adhesive and the particles. However, it is satisfactory to arrange such that the forward scattering intensity is stronger than the backward scattering intensity by two to five times.

According to a third aspect of the present invention, there is provided An optical spatial transmission apparatus comprising: a plurality of lasers for converting data into optical signals; an optical system having an optical diffusion plate for diffusing the optical signals and emitting the diffused optical signals to space; and a photoreceptor for receiving the diffused optical signals propagating the space to reproduce the data, wherein beams from the lasers are superposed to one another or arranged closely so that a spot of the beam on the optical diffusion plate becomes smaller than an aspect ratio with respect to a radiation angle of the laser.

BRIEF DESCRIPTION OF THE SEVERAL VIEWS OF THE DRAWING

FIGS. 1A, 1B and 1C are diagrams for showing the structure of the near-infrared communication apparatus according to a first embodiment of the present invention;

FIGS. 2A, 2B and 2C are diagrams for showing the structure of the near-infrared communication apparatus according to a second embodiment of the present invention;

FIGS. 5A and 5B are diagrams for showing the structure of the near-infrared communication apparatus according to a fourth embodiment of the present invention;

FIG. 6 is a diagram for showing the structure of the prior-art near-infrared communication apparatus;

FIG. 7 is a cross sectional diagram of the optical diffusing apparatus for the optical spatial transmission apparatus according to a fifth embodiment of the present invention;

FIG. 8 is a cross sectional diagram of the optical diffusing apparatus for the optical spatial transmission apparatus according to a sixth embodiment of the present invention;

FIG. 9 is a cross sectional diagram of the optical diffusing apparatus for the optical spatial transmission apparatus according to a seventh embodiment of the present invention;

FIG. 10 is a cross sectional diagram of the optical diffusing apparatus for the optical spatial transmission apparatus according to an eighth embodiment of the present invention;

FIG. 11 is a cross sectional diagram of the optical diffusing apparatus for the optical spatial transmission apparatus according to a ninth embodiment of the present invention;

FIG. 12 is a diagram for explaining the prior-art optical spatial transmission apparatus; and FIG. 13 is a diagram for explaining the optical diffusing plate of the prior-art optical spatial transmission apparatus.

DETAILED DESCRIPTION OF THE INVENTION

Figure 3A:
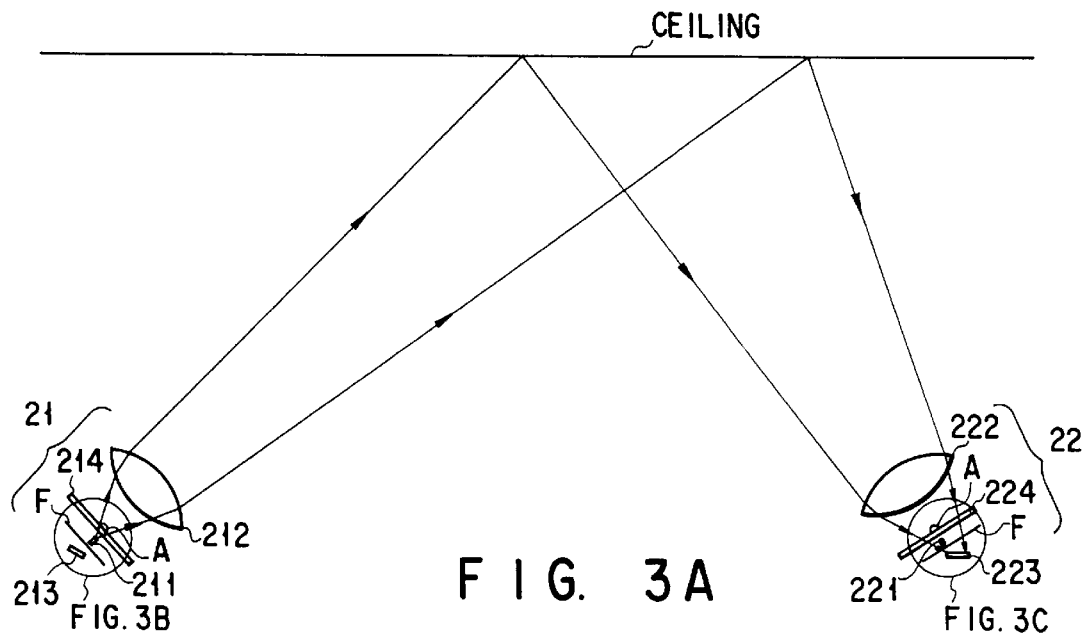
FIGS. 3A, 3B and 3C are diagrams for showing the structure of the near-infrared communication apparatus according to a third embodiment of the present invention.

Embodiments of the present invention will be explained below in detail with reference to FIGS. 1A to 5B.

FIGS. 1A to 1C show the structure of a first embodiment of the near-infrared communication apparatus relating to the present invention, in which first and second optical transceivers 21 and 22 are installed on the table respectively.

The first optical transceiver 21 includes a photoemissive device (such as a semiconductor laser) for generating a light having a suitable spread, an optical lens 212 for converting a light emitted from the photoemissive device 211 to a substantially collimated light and for collecting a light from the same direction as that of the light emitting direction, and a photoreceptor (such as, for example, a photodiode (PD)) 213 for monitoring a light emitted from the side opposite to the light emitting surface of the photoemissive device 211 and for receiving a light incident through the optical lens 212. The second optical transceiver 22 includes a photoemissive device 221, an optical lens 222 and a photoreceptor 223, in the same manner as the first optical transceiver 21.

The laser emission directions of the first and second optical transceivers 21 and 22 are directed to the mutually same area of the ceiling.

The operation of the near-infrared communication apparatus having the above-described structure will be explained.

Assume that the first optical transceiver 21 is the transmission state and the second optical transceiver 22 is the receiving state. The operation in this case is as follows. The photoemissive device 211 of the first optical transceiver 21 emits a signal light with a certain spread of the light. This light is outputted to the ceiling by being converted to a substantially collimated light by the optical lens 212. In order to obtain this kind of light, an end surface of a semiconductor laser to be used as the photoemissive device 211 is provided at the focusing point of the optical lens 212.

The light emitted to the ceiling is diffused by a diffused reflection. A part of the diffused light is taken into the optical lens 222 of the second optical transceiver 22 and is then collected by the photoreceptor 223. Since the light diffused on the ceiling has a low spatial coherency, an image of the portion of the ceiling where the light is emitted is formed when the light is collected by the optical lens 222.

In the second optical transceiver 22, the image formed by collecting the light by the optical lens 222 is larger than the size of the light emitting section of the photoemissive device 221, and therefore, if the photoreceptor 223 of a larger size which can receive the light without being interfered by the photoemissive device 221 is installed, it is possible to receive the signal light from the first optical transceiver 21. This can also be applied to the case where the second optical transceiver 22 is in the transmission state and the first optical transceiver 21 is in the receiving state.

When a semiconductor laser is used for the photoemissive devices 211 and 221, the photoreceptors 213 and 223 of the optical transceivers 21 and 22 respectively can be used as optical monitors of the semiconductor lasers at the time of transmission. For this purpose, the photoreceptors 213 and 223 are disposed with a slight inclination so that a reflection return light to the photoemissive devices 211 and 221 are reduced.

FIGS. 2A to 2C show the structure of a second embodiment relating to the present invention. In FIGS. 2A to 2C, portions which are the same as those in FIGS. 1A to 1C are attached with the same symbols to show that they are the same, for which a duplicated explanation will be omitted.

The present embodiment is devised so that the quantity of light not interfered by the photoemissive devices 211 and 221 is increased. To be more specific, the light from the photoemissive device 211 is converted into an optical beam of a relatively larger width by the optical lens 212 and is outputted to the ceiling. In order to obtain this kind of beam, the end surface of the photoemissive device 211 is located inside a focusing plane F of the optical lens 212. This is also the same for the second optical transceiver 22.

When the ceiling is irradiated with the optical beam of the relatively larger width as described above, the image of the ceiling on which the light is collected by the optical lens 222 becomes larger than the photoemissive device. Accordingly, the proportion of the light interfered by the photoemissive devices 211 and 221 is reduced so that the light receiving sensitivity can be improved.

The photoemissive devices 211 and 221 may be high-output LEDs. Further, concave mirrors can also be used instead of the optical lenses 212 and 222. However, since the lenses can both transmit and receive the light, it is possible to provide a compact and more productive apparatus by using the lenses.

Figure 3B:
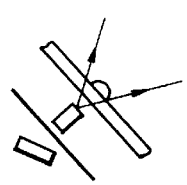
Figure 3C:
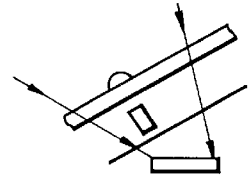

FIGS. 3A to 3C show the structure of a third embodiment according to the present invention. In FIGS. 3A to 3C, portions which are the same as those in FIGS. 2A to 2C are attached with the same symbols to show that they are the same, for which a duplicated explanation will be omitted.

In the present embodiment, in the optical transceivers 21 and 22, optical diffusing plates 214 and 224 are disposed in front of the light emitting surface of the photoemissive devices 211 and 221 respectively. In the example of FIGS. 3A to 3C, the forward scattering light from the optical diffusing plate 214 is emitted to the indoor ceiling through the optical lens 212 for converting the light to a substantially collimated light, and the light is further diffused on the ceiling. The optical diffusing plate 214 has a fine diffusion section A. Except the diffusion section A, all other portions are transparent to the light signal.

A part of the light diffused on the ceiling is incident to the optical lens 222 at the light receiving side, and is then collected to the photoreceptor 223. Prior to the light incident to the photoreceptor 223, a part of the light is interfered by the diffusion section A of the optical diffusing plate 224 and the photoemissive device 221. However, the interfered portions of the light are small and the light loss is small because they are located in front of the image focusing surface.

When the optical diffusing plates 214 and 224 are disposed inside the focusing surface F of the optical lenses 212 and 222 and the photoreceptors 213 and 223 for receiving the light are disposed outside the focusing surface F, the proportion of the light interfered by the photoemissive devices 211 and 221 and the diffusion section A of the optical diffusing plates 214 and 224 is reduced so that the light receiving sensitivity can be improved.

Figure 4:
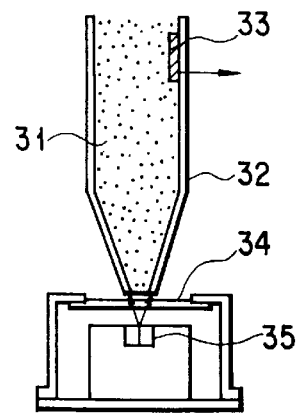
FIG. 4 is a cross sectional diagram of a manufacturing apparatus for explaining a method of manufacturing the optical diffusing plate to be used for the near-infrared communication apparatus according to the third embodiment of the present invention.

The diffusion section A of the optical diffusing plates 214 and 224 can be formed by mixing fine particles into an adhesive and by coating the mixture on a panel-shaped member. The state of manufacturing the diffusion section A is shown in FIG. 4.

At first, a mixture 31 of an epoxy-resin based adhesive with fine particles such as aluminum of particle size ranging from 0.1 to 0.3 μm, for example, is stuffed into a coating nozzle 32. A photodetector 33 is disposed in advance in the nozzle 32. In the mean time, a panel member 34 is fixed to face a light emitting surface of the semiconductor laser 35.

In this state, the position of the nozzle 32 is adjusted so that the light intensity obtained from the optical detector 33 in the nozzle 32 becomes a maximum by emitting the semiconductor laser 35. Then, the mixture 31 is coated on the panel-shaped member 34. By carrying out the above-described processing, the diffusion section A can be formed locally. Since the diffusion section A is in hemispherical shape, a lens effect is generated to efficiently guide the light to the main lenses 212 and 222.

According to the present embodiment, since the lenses are used for both light transmission and light reception, a compact and low-cost apparatus can be provided. Further, when semiconductor lasers are used for the photoemissive devices 211 and 221 for transmitting the light signal, a high-speed modulation can be carried out and a high-out transmission signal can be obtained efficiently. Particularly, since the diffusion section A is present, the apparatus can be used without affecting bad influence to the human body even if a high-output light is transmitted.

The present invention can also be applied to the spatial transmission which does not diffuse the light on the ceiling. FIGS. 5A and 5B show the structure of a fourth embodiment of the present invention for achieving this. In FIGS. 5A and 5B, an optical transceiver 41 is installed on the ceiling, and an optical transceiver 42 is located on the desk. An optical beam of the optical transceiver 42 on the desk is directed to the optical transceiver 41 on the ceiling. The optical transceiver 42 on the desk can be replaced with the optical transceiver 21 (or 22) shown in FIGS. 1A to 1C, FIGS. 2A to 2C, and FIGS. 3A to 3C, respectively.

The optical transceiver 41 on the ceiling has a plurality of semiconductor lasers 411 for signal transmission and a photodiode 412 for signal receiving, and they are nondirectional as a whole. The light from the semiconductor lasers 411 is diffused by an optical diffusing section 413 so that a light with a certain spread is emitted. The plurality of semiconductor lasers 411 cover the whole light, and the emission direction is made nondirectional.

The optical transceiver 42 on the desk uses a semiconductor laser 421 as the photoemissive device and a diffusing member 422 is disposed in the light emitting direction, unlike the conventional optical transceiver 12 shown in FIG. 6. A concave mirror 423, a photodiode 424 and a concave mirror 425 are the same as those used in the conventional optical transceiver 12 shown in FIG. 6.

To be more specific, in the optical transceiver 42 on the desk, a transmission light emitted from the semiconductor laser 421 is diffused by the diffusing member 422, and is then converted into a substantially collimated light by the concave mirror 423 and outputted to the optical transceiver 41 on the ceiling. Further, a transmission light from the optical transceiver 41 on the ceiling is collected to the photodiode 424 by the concave mirror 425. With the above-described optical system, it is possible to carry out communications between the optical transceiver 41 on the ceiling and the optical transceiver 42 on the desk.

According to the present embodiment, a high-speed modulation is possible and a high-output transmission light can be obtained efficiently because semiconductor lasers are used for a light transmission. Further, since the diffusing member is available, there is no bad influence to the human body. Further, since directivity is weakened, the angular adjustment of the apparatus on the desk can be done easily.

In the above-described embodiment, description has been made of the case where an optical beam is emitted to the ceiling. However, the present invention can also be applied to the case where the optical beam is emitted to the wall surface or to the floor or the like, depending on the location.

According to the explanation of the above-described embodiment, a compact and highly productive near-infrared communication apparatus which can carry out a high-speed transmission without a potential of application of bad influence to the human body can be provided.

The optical spatial transmission apparatus relating to a fifth embodiment of the present invention will be explained below.

Referring to FIG. 7, the optical spatial transmission apparatus is structured by a glass plate 51, an optical diffusion area 52, a mirror 54 having a pin hole 56, and a laser diode (LD) 55 for outputting a laser beam 53.

The mirror 54 is formed by remaining the pin hole 56 on a part of the surface of the glass plate 54. The mirror 54 is formed by evaporating an aluminum thin film, for example, on the glass plate 51. The optical diffusion area 52 is formed on the mirror 54. The above-described frost-type glass or opal-type glass can be used for the optical diffusion area 52.

Consider the case where the LD beam 53 is optically diffused in the above-described structure. The LD beam 53 incident to the optical diffusing plate from the pin hole 56 is diffused to almost all directions in the optical diffusion area 52. Of the diffused beams, the beams progressing to the −z direction (that is, the direction of the glass plate 51) are reflected by the mirror 54 except the beams which return to the pin hole 56. Accordingly, almost all the diffused beams are discharged to the +z direction (that is, the beam direction of the LD beams).

The glass plate 51 does not necessarily be plane but may be in a ball shape. The glass plate may be replaced with another material.

FIG. 8 shows an optical diffusing apparatus according to a sixth embodiment of the present invention. This optical diffusing apparatus is structured by a glass plate 61, an optical diffusing area 62, a laser diode (LD) 65 for outputting an LD beam 63, and a mirror 64 having a pin hole 66.

In the present embodiment, the optical diffusion area 62 is formed in a convex lens shape. In this case, the LD beam 63 incident from the pin hole 66 is diffused in the optical diffusing area 62. The diffused light is easily discharged to the +z direction (that is, the beam direction of the LD beam) because the optical diffusion area 62 is in the lens shape. In other words, the diffused light is reflected by the border between the space and the optical diffusion area 62 so that the light can not return to the optical diffusion area 62 again.

Strictly speaking, when the magnitude of the diffusion of the diffusion area 62 is all uniform regardless of the location, the above-described effect can not be expected so much. Therefore, when the magnitude of diffusion is made smaller toward the outside (that is, toward the convex section), the diffused light can be easily discharged from the optical diffusion area 62. In order to provide a locational distribution to the optical diffusion, the distribution of the number of fine particles which are the optical diffusion substance is changed in the case of the opal-type glass.

FIG. 9 shows an optical diffusing apparatus according to a seventh embodiment of the present invention. This optical diffusing apparatus is structured by a glass plate 71, an optical diffusion area 72, a laser diode (LD) 75 for outputting an LD beam 73, a mirror 74 having a pin hole 76, and a lens 77.

The optical diffusing apparatus of the present embodiment is a modification of the six embodiment shown in FIG. 8, and has a state that the optical diffusion area 72 are the lens 77 are separated functionally. In this case, once-diffused optical signal can be focused with the lens 77 designed separately from the optical diffusion area, so that the diffused light reaching the lens 77 can be effectively emitted within the cover area.

Further, FIG. 10 shows an optical diffusing apparatus according to an eighth embodiment of the present invention. In this embodiment, an LD chip 85 is buried in the diffusion area 82. In this case, not only the forward light but also the backward light can be used, so that the power budget of the light can be mitigated substantially. It is effective to use a substance of high thermal conductivity for a diffusion material for radiating the heat of the LD chip.

When the optical diffusing plate explained with reference to FIGS. 7 to 10 is applied to the conventional optical spatial transmission apparatus shown in FIG. 12, it is possible to achieve a transmission which is safe for the human body and which has small optical loss. Accordingly, a handy optical spatial transmitting apparatus which can increase the data transmission speed and can expand the cover area, as the severer power budget, can be structured.

When an infrared area of around 850 nm is used as the transmission wavelength, a low-cost Si system PD can be used for the photoreceptor, with the advantage that the background photonoise is relatively small.

FIG. 11 shows an optical diffusing apparatus of a ninth embodiment of the present invention. This optical diffusing apparatus is structured by an optical diffusing plate 91. Laser beams $93_1$, $93_2$, ... $93_n$ outputted from laser diodes (LD) $92_1$, $92_2$, ... $92_n$ are irradiated to this optical diffusing plate 91.

According to the ninth embodiment, the optical beams $93_1$, $93_2$, ... $93_n$ emitted from the plurality of laser diodes $92_1$, $92_2$, ... $92_n$ are irradiated to the optical diffusing plate 91. Generally, an aspect ratio of a laser diode, i.e., a ratio of the horizontal axis to the vertical axis with respect to a radiation angle of a laser diode deviates greatly from 1. The expanding angles of the respective laser diodes $92_1$, $92_2$, ... $92_n$ are 10° and 25° in perpendicular and horizontal, for example, thus forming an oval shape. The beams $93_1$, $93_2$, ... $93_n$ of these laser diodes are irradiated to the optical diffusing plate 91 close to the optical diffusing plate 91 so that the beams applied to the optical diffusing plate form a shape close to one square or one true circle as a whole. In this case, the beam pattern formed by the lens at the receiving side is close to a square or a true circle, so that the beam pattern well matches the light receiving surface of the photoreceptor. Accordingly, it is not necessary to uselessly increase the stray capacity of the photoreceptor and thus, the data transmission speed can be increased. Further, it is also effective to transmit the optical signal after reshaping with the lens the optical signal once diffused at the transmitter side. According to the present invention, since a plurality of laser diodes are used, there is also a merit of increasing the optical power of the receiving light.

We claim:

1. A near-infrared communication apparatus comprising:
   a plurality of optical transceivers for carrying out optical communications by transmitting and receiving a signal light of near-infrared rays through an indoor space, each of the optical transceivers including:
   at least one photoemissive device for generating the signal light of near-infrared rays;
   at least one photoreceptor for receiving the signal light of near-infrared rays from another of the optical transceivers; and
   at least one common optical system, used in common in transmitting and receiving the signal light, for converting the signal light output from the photoemissive device to a substantially collimated light and directing it in an arbitrary direction to an indoor optical diffusion surface within the indoor space to form a lightened portion on the indoor optical diffusion surface and focusing a light from the lightened portion in the same direction as the arbitrary direction on the photoreceptor of a corresponding one of the transceivers to form a light spot having a size larger than a size of the light photoemissive device on the photoreceptor, wherein the optical system is arranged so as to direct directivity of each of the optical transceivers to the same portion within the indoor optical diffusion surface.

2. A near-infrared communication apparatus according to claim 1, wherein the photoemissive device comprises a semiconductor laser having a laser emitting surface for emitting a laser light, and the photoreceptor comprises a photodiode for monitoring a light emitted from a surface of the semiconductor laser which is opposite to the laser emitting surface.

3. A near-infrared communication apparatus according to claim 1, wherein an end surface of the photoemissive device is located inside a focusing plane of the optical system so that the optical system converts the signal light into collimated light having a relatively large width.

4. A near-infrared communication apparatus comprising a plurality of optical transceivers for carrying out optical communications by transmitting and receiving a signal light of near-infrared rays through an indoor space, each of the optical transceivers including:
   at least one semiconductor laser for generating the signal light of near-infrared rays;
   at least one photoreceptor for receiving the signal light of near-infrared rays from another of the optical transceivers; and
   at least one common optical system, used in common in transmitting and receiving the signal light, for converting the signal light output from the photoemissive device to a substantially collimated light, and for directing it in an arbitrary direction and focusing a light from the same direction as the arbitrary direction to the photoreceptor of a corresponding one of the transceivers, wherein the optical system is arranged so as to direct directivity of each of the optical transceivers to the same portion within an indoor optical diffusion surface, and has at least one optical diffusion plate for diffusing the signal light, the optical diffusion plate having Mie scattering characteristic in which forward scattering light intensity is stronger than backward scattering light intensity.

5. A near-infrared communication apparatus according to claim 4 wherein the optical diffusion plate comprises a plate member and a diffusion layer formed by coating a mixture of fine particles and adhesive on the plate member.

6. A near-infrared communication apparatus according to claim 5 wherein the optical diffusion plate is formed by stuffing a mixture of said fine particles with said adhesive into a nozzle having a photoreceptor inside said nozzle, integrating the plate member with the semiconductor laser, adjusting a position of the nozzle so that a intensity of a light emitted by the semiconductor laser and detected by the photoreceptor inside the nozzle becomes maximum, and coating the mixture on said panel-shaped member.

7. A near-infrared communication apparatus according to claim 4, wherein each of the optical transceivers includes an optical system for converting forward scattering light from the optical diffusion plate to a substantially collimated light and directing the collimated light toward an indoor diffusion surface.

8. A near-infrared communication apparatus according to claim 7 wherein the optical diffusion plate comprises a plate member and a diffusion layer formed by coating a mixture of fine particles and adhesive on the plate member.

9. A near-infrared communication apparatus according to claim 7 wherein the optical diffusion plate of each of the optical transceivers is arranged inside a focal plane of the optical system and the photoreceptor is located outside the focal plane.

10. A near-infrared communication apparatus according to claim 4, wherein an end surface of the photoemissive device is located inside a focusing plane of the optical system so that the optical system converts the signal light into collimated light having a relatively large width.

11. A near-infrared communication apparatus comprising a plurality of optical transceivers for carrying out optical communications by transmitting and receiving a signal light of near-infrared rays through an indoor space, each of the optical transceivers including:
    at least one semiconductor laser for generating the signal light of near-infrared rays; and
    at least one optical diffusion plate for diffusing the signal light from the semiconductor laser, the optical diffusion plate having Mie scattering characteristic in which forward scattering light intensity is stronger than backward scattering light intensity.

12. A near-infrared communication apparatus according to claim 11, wherein each of the optical transceivers includes an optical system for converting the forward scattering light from the optical diffusion plate to a substantially collimated light and emitting the collimated light toward an indoor diffusion surface.

13. A near-infrared communication apparatus according to claim 12 wherein the optical diffusion plate of each of the optical transceivers is arranged inside a focal plane of the optical system and the photoreceptor is located outside the focal plane.

* * * * *